(12) United States Patent
McAuley

(10) Patent No.: US 9,475,197 B1
(45) Date of Patent: Oct. 25, 2016

(54) GRIPPING ASSEMBLY

(71) Applicant: Gabriel McAuley, Elmwood Park, NJ (US)

(72) Inventor: Gabriel McAuley, Elmwood Park, NJ (US)

( * ) Notice: Subject to any disclaimer, the term of this patent is extended or adjusted under 35 U.S.C. 154(b) by 0 days.

(21) Appl. No.: 14/932,710

(22) Filed: Nov. 4, 2015

(51) Int. Cl.
*B25J 1/02* (2006.01)
*B25J 15/00* (2006.01)

(52) U.S. Cl.
CPC ............... *B25J 15/0028* (2013.01); *B25J 1/02* (2013.01)

(58) Field of Classification Search
CPC ........ B25J 1/04; B25J 15/0028; B25J 15/12; B25J 1/02; B25B 9/02; F16B 2/10
USPC ............ 294/100; 24/515, 537; 150/147, 148
See application file for complete search history.

(56) References Cited

U.S. PATENT DOCUMENTS

| | | | | |
|---|---|---|---|---|
| 1,030,386 A | * | 6/1912 | Comeau | A41F 11/02 24/515 |
| 1,141,742 A | * | 6/1915 | Wiseman | B25C 11/00 254/18 |
| 2,553,479 A | * | 5/1951 | Schmarje | B25B 23/106 294/100 |
| 3,420,563 A | * | 1/1969 | Witt | A22C 25/025 294/100 |
| 3,924,303 A | * | 12/1975 | Elliott | D06F 55/00 24/536 |
| 4,324,125 A | * | 4/1982 | Jarman | B21D 25/04 24/536 |
| 4,817,253 A | | 4/1989 | Harmatuik | |
| 5,407,243 A | * | 4/1995 | Riemann | A01M 3/00 294/100 |
| 6,565,058 B1 | * | 5/2003 | Holland | B42F 1/006 24/503 |
| 6,571,505 B1 | * | 6/2003 | Poiencot, Jr. | A01K 97/14 119/806 |
| 6,871,435 B2 | | 3/2005 | Yoshida | |
| D511,444 S | | 11/2005 | Ridgley-Grenier | |
| 7,272,994 B1 | | 9/2007 | Johnson | |
| 8,434,803 B1 | * | 5/2013 | An | B25J 1/04 294/212 |
| 8,726,953 B2 | | 5/2014 | Paulsen | |
| 8,776,846 B1 | | 7/2014 | Thompson et al. | |
| 2006/0117630 A1 | | 6/2006 | Raia et al. | |
| 2010/0127225 A1 | | 5/2010 | Mika-Duesler | |

\* cited by examiner

*Primary Examiner* — Dean Kramer

(57) ABSTRACT

A gripping assembly for removing a credit card from a wallet includes a housing that may be gripped. A gripping unit is slidably positioned within the housing. The gripping unit is selectively extendable outwardly from the housing. Thus, the gripping unit may grip a credit card thereby facilitating the credit card to be removed from a wallet.

10 Claims, 3 Drawing Sheets

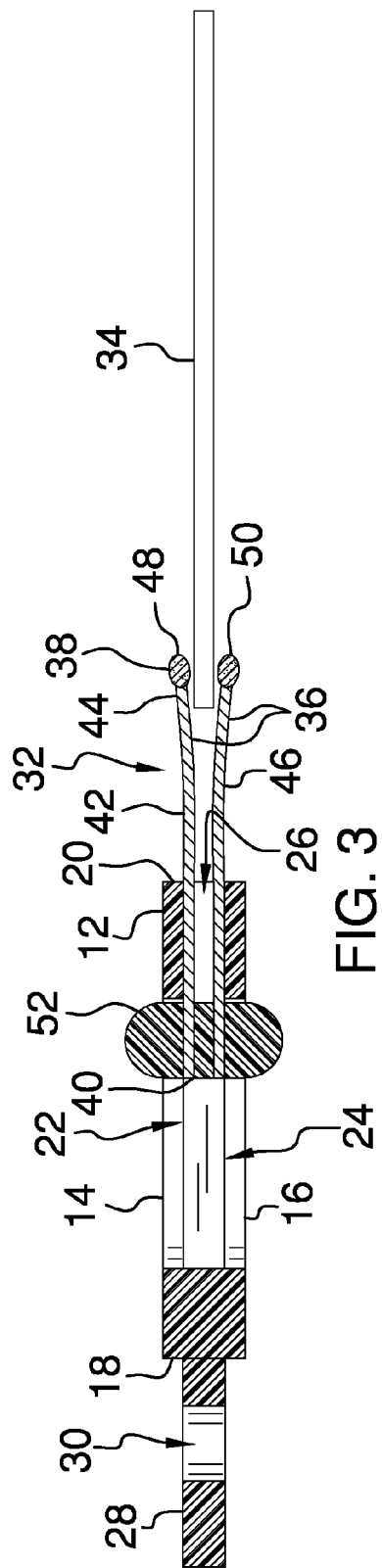
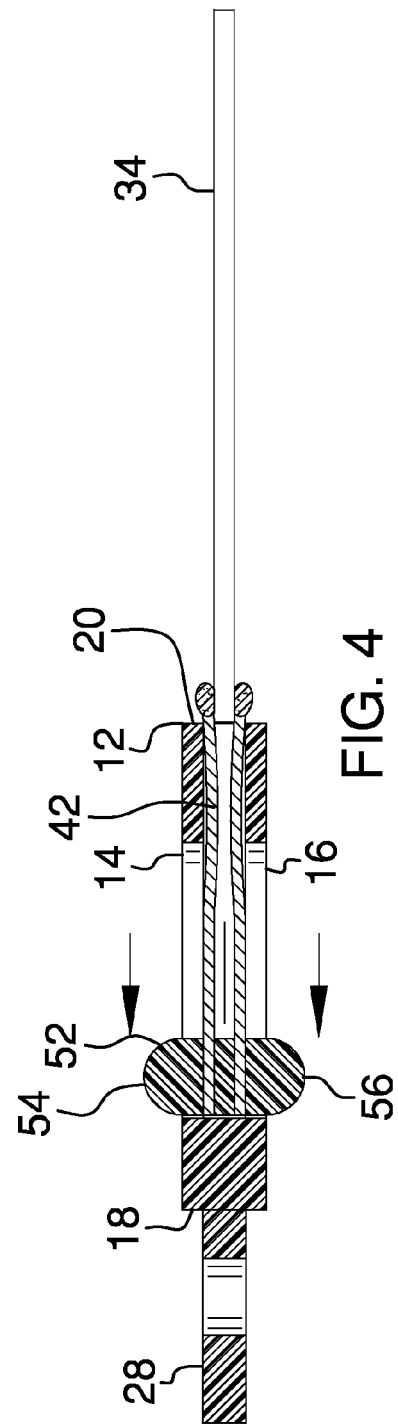

GRIPPING ASSEMBLY

BACKGROUND OF THE DISCLOSURE

Field of the Disclosure

The disclosure relates to gripping devices and more particularly pertains to a new gripping device for removing a credit card from a wallet.

SUMMARY OF THE DISCLOSURE

An embodiment of the disclosure meets the needs presented above by generally comprising a housing that may be gripped. A gripping unit is slidably positioned within the housing. The gripping unit is selectively extendable outwardly from the housing. Thus, the gripping unit may grip a credit card thereby facilitating the credit card to be removed from a wallet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a cross sectional view taken along line 3-3 of FIG. 2 of an embodiment of the disclosure in an extended position.

FIG. 4 is a cross sectional view taken along line 3-3 of FIG. 2 of an embodiment of the disclosure in a retracted position.

DESCRIPTION OF THE PREFERRED EMBODIMENT

Figure 1:
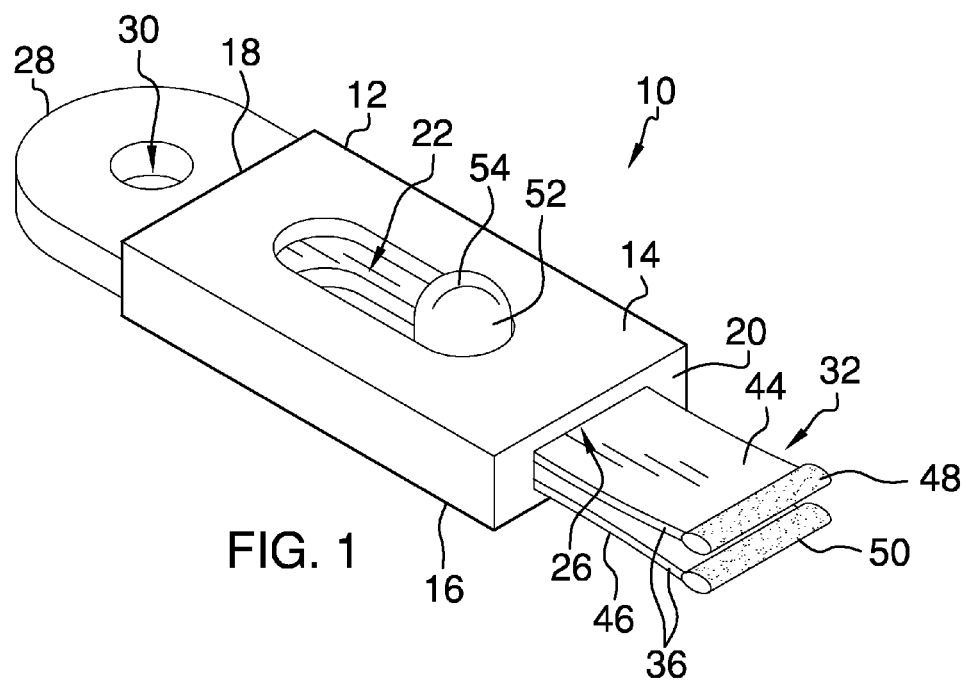
FIG. 1 is a front perspective view of a gripping assembly according to an embodiment of the disclosure.
Figure 2:
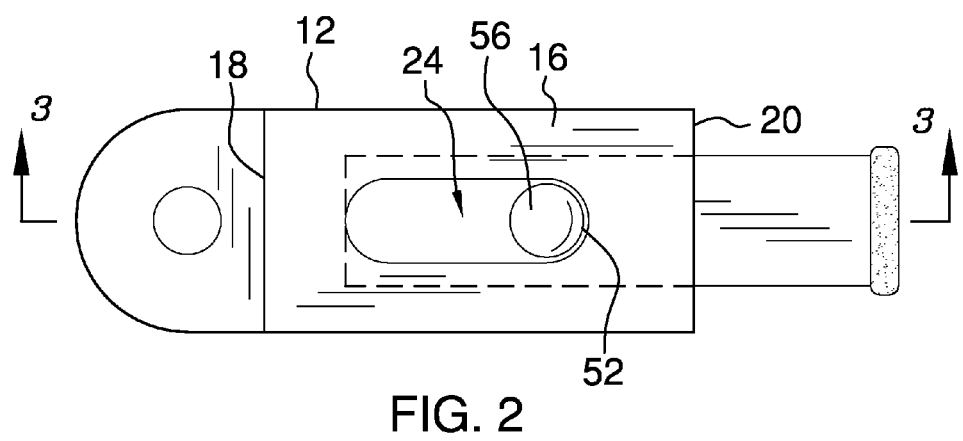
FIG. 2 is a bottom view of an embodiment of the disclosure.
Figure 5:
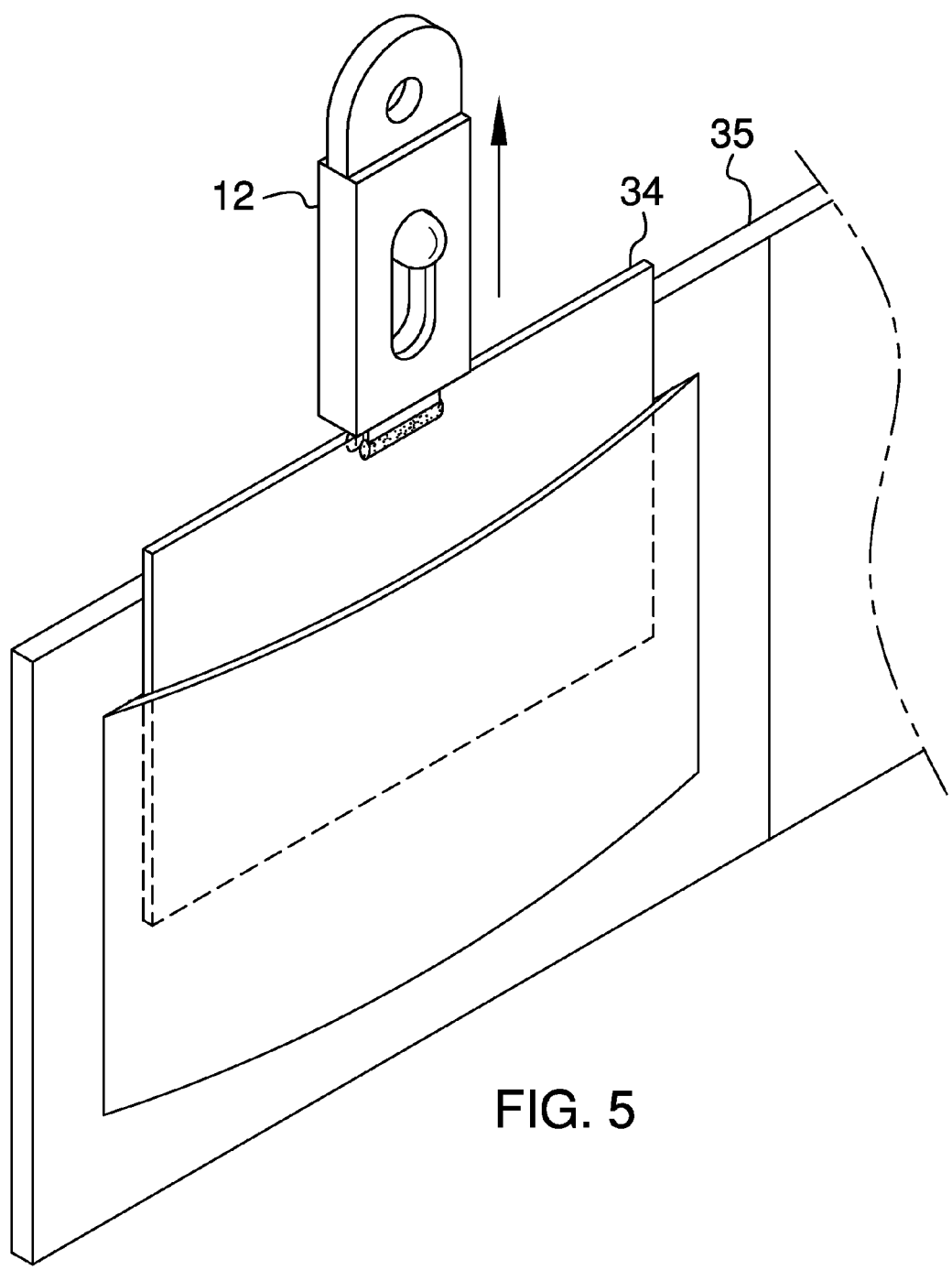
FIG. 5 is a perspective in-use view of an embodiment of the disclosure.

With reference now to the drawings, and in particular to FIGS. 1 through 5 thereof, a new gripping device embodying the principles and concepts of an embodiment of the disclosure and generally designated by the reference numeral 10 will be described.

As best illustrated in FIGS. 1 through 5, the gripping assembly 10 generally comprises a housing 12 that may be gripped. The housing 12 has a top wall 14, a bottom wall 16, a back wall 18 and a front wall 20. The top wall 14 has a first slot 22 extending therethrough and the first slot 22 extends substantially between the back wall 18 and the front wall 20. The bottom wall 16 has a second slot 24 extending therethrough and the second slot 24 extends substantially between the back wall 18 and the front wall 20. The second slot 24 is aligned with the first slot 22.

The front wall 20 has an opening 26 extending therethrough and the housing 12 is substantially hollow. A tab 28 is coupled to and extends away from the back wall 18. The tab 28 has an aperture 30 extending therethrough. Thus, the tab 28 may be coupled to a key ring or the like thereby facilitating the housing 12 to be carried.

A gripping unit 32 is slidably positioned within the housing 12. The gripping unit 32 is selectively extendable outwardly from the housing 12. The gripping unit 32 may be manipulated to grip a credit card 34 or the like. Thus, the credit card 34 may be removed from a wallet 35.

The gripping unit 32 comprises a pair of plates 36. Each of the plates 36 has a front end 38 and a back end 40. Each of the plates 36 is elongated between the front end 38 and the back end 40. Each of the plates 36 is slidably positioned within the housing 12. The front end 38 corresponding to each of the plates 36 extends outwardly from the opening 26 and the plates 36 are spaced apart from each other.

Each of the plates 36 has a bend 42 thereon. The bend 42 on each of the plates 36 is positioned closer to the front end 38 than the back end 40. The pair of plates 36 includes a first plate 44 and a second plate 46. The first plate 44 is oriented such that the front end 38 corresponding to the first plate 44 is biased upwardly with respect to the back end 40 corresponding to the first plate 44. The second plate 46 is oriented such that the front end 38 corresponding to the second plate 46 is biased downwardly with respect to the back end 40 corresponding to the second plate 46.

A first grip 48 is coupled to the front end 38 corresponding to the first plate 44. The first grip 48 is coextensive with the front end 38 corresponding to the first plate 44. A second grip 50 is coupled to the front end 38 corresponding to the second plate 46. The second grip 50 is coextensive with the front end 38 corresponding to the second plate 46. Each of the first grip 48 and the second grip 50 may be comprised of a resiliently compressible material such as rubber.

A button 52 is coupled between each of the plates 36 and the button 52 is positioned adjacent to the back end 40 corresponding to each of the plates 36. The button 52 has a first end 54 and a second end 56. The first end 54 extends outwardly from the first slot 22 and the first end 54 may be manipulated. The second end 56 extends outwardly from the second slot 24 and the second end 56 may be manipulated.

The gripping unit 32 is positionable in an extended position having the button 52 being urged toward the front wall 38. Each of the plates 36 extends substantially outwardly from the opening 26. The first grip 48 is biased away from the second grip 50. Thus, the credit card 34 may be positioned between the first grip 48 and the second grip 50.

The gripping unit 32 is positionable in a retracted position having the button 52 being urged toward the back wall 40. Each of the plates 36 is substantially retracted into the opening 26. The first grip 48 is biased toward the second grip 50 and each of the first grip 48 and the second grip 50 frictionally engage the credit card 34. Thus, the credit card 34 may be removed from the wallet 35.

In use, the housing 12 is gripped and the button 52 is urged toward the front wall 20 of the housing 12. Each of the plates 36 extends outwardly from the opening 26 and the plates 36 are biased away from each other. The housing 12 is manipulated such that the credit card 34 is positioned between the plates 36. The button 52 is urged toward the back wall 18 of the housing 12. Each of the plates 36 retracts into the opening 26. Each of the first grip 48 and the second grip 50 frictionally engage the credit card 34. The housing 12 is manipulated to remove the credit card 34 from the wallet 35. Thus, the gripping unit 32 enhances the credit card 34 being removed from the wallet 35.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gripping assembly comprising:
    a housing being configured to be gripped, said housing having an opening, said housing having a top wall, a bottom wall, a back wall and a front wall, said top wall having a first slot extending therethrough, said bottom wall has a second slot extending therethrough;
    a gripping unit being slidably positioned within said housing, said gripping unit being selectively extendable outwardly from said housing wherein said gripping unit is configured to grip a credit card thereby facilitating the credit card to be removed from a wallet, said gripping unit comprising a pair of plates, each of said plates having a front end and a back end, each of said plates being elongated between said front end and said back end, each of said plates being slidably positioned within said housing such that said front end corresponding to each of said plates extends outwardly from said opening, said plates being spaced apart from each other;
    a button being coupled between each of said plates, said button being positioned adjacent to said back end corresponding to each of said plates;
    wherein said button has a first end and a second end, said first end extending outwardly from said first slot wherein said first end is configured to be manipulated, said second end extending outwardly from said second slot wherein said second end is configured to be manipulated.

2. The assembly according to claim 1, wherein:
    said first slot extends substantially between said back wall and said front wall;
    said second slot extends substantially between said back wall and said front wall, said second slot being aligned with said first slot; and
    said front wall has an opening extending therethrough, said housing being substantially hollow.

3. The assembly according to claim 2, further comprising a tab being coupled to and extending away form said back wall, said tab having an aperture extending therethrough wherein said tab is configured to be coupled to a key ring.

4. The assembly according to claim 1, wherein each of said plates having a bend thereon, said bend on each of said plates being positioned closer to said front end than said back end, said pair of plates including a first plate and a second plate.

5. The assembly according to claim 4, wherein said first plate is oriented such that said front end corresponding to said first plate is biased upwardly with respect to said back end corresponding to said first plate, said second plate being oriented such that said front end corresponding to said second plate is biased downwardly with respect to said back end corresponding to said second plate.

6. The assembly according to claim 4, further comprising a first grip being coupled to said front end corresponding to said first plate, said first grip being coextensive with said front end corresponding to said first plate.

7. The assembly according to claim 4, further comprising a second grip being coupled to said front end corresponding to said second plate, said second grip being coextensive with said front end corresponding to said second plate.

8. The assembly according to claim 1, wherein:
    said gripping unit includes a first grip and a second grip; and
    said gripping unit being positionable in an extended position having said button being urged toward said front wall, each of said plates extending substantially outwardly from said opening having said first grip being biased away from said second grip wherein said gripping unit is configured to engage the credit card.

9. The assembly according to claim 8, wherein said gripping unit is positionable in a retracted position having said button being urged toward said back wall, each of said plates being substantially retracted into said opening having said first grip being biased toward said second grip wherein each of said first grip and said second grip are configured to frictionally engage the credit card thereby facilitating the credit card to be removed from the wallet.

10. A gripping assembly comprising:
    a housing being configured to be gripped, said housing having a top wall, a bottom wall, a back wall and a front wall, said top wall having a first slot extending therethrough, said first slot extending substantially between said back wall and said front wall, said bottom wall having a second slot extending therethrough, said second slot extending substantially between said back wall and said front wall, said second slot being aligned with said first slot, said front wall having an opening extending therethrough, said housing being substantially hollow;
    a tab being coupled to and extending away form said back wall, said tab having an aperture extending therethrough wherein said tab is configured to be coupled to a key ring; and
    a gripping unit being slidably positioned within said housing, said gripping unit being selectively extendable outwardly from said housing wherein said gripping unit is configured to grip a credit card thereby facilitating the credit card to be removed from a wallet, said gripping unit comprising:
        a pair of plates, each of said plates having a front end and a back end, each of said plates being elongated between said front end and said back end, each of said plates being slidably positioned within said housing such that said front end corresponding to each of said plates extends outwardly from said opening, said plates being spaced apart from each other, each of said plates having a bend thereon, said bend on each of said plates being positioned closer to said front end than said back end, said pair of plates including a first plate and a second plate, said first plate being oriented such that said front end corresponding to said first plate is biased upwardly with respect to said back end corresponding to said first plate, said second plate being oriented such that said front end corresponding to said second plate is biased downwardly with respect to said back end corresponding to said second plate, a first grip being coupled to said front end corresponding to said first plate, said first grip being coextensive with said front end corresponding to said first plate, a second grip being coupled to said front end corresponding to said second plate, said second grip being coextensive with said front end corresponding to said second plate, and a button being coupled between each of said plates, said button being positioned adjacent to said back end corresponding to each of said plates, said button having a first end and a second end, said first end extending outwardly from said first slot wherein said first end is configured to be manipulated, said second end extending outwardly from said second slot wherein said second end is configured to be manipulated, said gripping unit being positionable in an extended position having said button being urged toward said front wall, each of said plates extending substantially outwardly from said opening having said first grip being biased away from said second grip wherein said gripping unit is configured to engage the credit card, said gripping unit being positionable in a retracted position having said button being urged toward said back wall, each of said plates being substantially retracted into said opening having said first grip being biased toward said second grip wherein each of said first grip and said second grip are configured to frictionally engage the credit card thereby facilitating the credit card to be removed from the wallet.

\* \* \* \* \*